US012680600B2

(12) United States Patent
Balsiger et al.

(10) Patent No.: US 12,680,600 B2
(45) Date of Patent: Jul. 14, 2026

(54) HARMONIC DRIVE WITH BALANCED EPICYCLIC GEARTRAIN HAVING A CARRIER WITH AN INTEGRATED WAVE GENERATOR

(71) Applicant: Hamilton Sundstrand Corporation, Charlotte, NC (US)

(72) Inventors: Derick S. Balsiger, Prescott Valley, AZ (US); Keith A. Bloxham, Gilbert, AZ (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/774,492

(22) Filed: Jul. 16, 2024

(65) Prior Publication Data

US 2026/0022760 A1 Jan. 22, 2026

(51) Int. Cl.
*F16H 49/00* (2006.01)
*B64C 13/34* (2006.01)
*B64C 13/50* (2006.01)

(52) U.S. Cl.
CPC ........... *F16H 49/001* (2013.01); *B64C 13/34* (2013.01); *B64C 13/50* (2013.01)

(58) Field of Classification Search
CPC ........ F16H 49/001; B64C 13/34; B64C 13/50
See application file for complete search history.

(56) References Cited

U.S. PATENT DOCUMENTS

| | | | |
|---|---|---|---|
| 3,101,009 A | 8/1963 | Walton | |
| 3,789,700 A | 2/1974 | Cotreau et al. | |
| 5,249,924 A | 10/1993 | Brum | |
| 7,297,087 B2 | 11/2007 | Degen et al. | |
| 10,641,377 B2 | 5/2020 | Frey et al. | |
| 2006/0030445 A1* | 2/2006 | Zheng | B62D 5/008 |
| | | | 475/5 |
| 2010/0072725 A1* | 3/2010 | Woellhaf | F16H 37/041 |
| | | | 254/362 |
| 2018/0209529 A1 | 7/2018 | Frey et al. | |
| 2023/0407955 A1 | 12/2023 | Whitfield | |

FOREIGN PATENT DOCUMENTS

| | | |
|---|---|---|
| CN | 110307299 A | 10/2019 |
| CN | 117028519 A | 11/2023 |

OTHER PUBLICATIONS

Extended European Search Report for EP Application No. 25189980. 3, dated Nov. 28, 2025, pp. 1-10.

* cited by examiner

*Primary Examiner* — Terence Boes
(74) *Attorney, Agent, or Firm* — Kilpatrick Townsend & Stockton LLP

(57) ABSTRACT

A harmonic drive having a housing with an outer shell defining an inner surface; an epicyclic geartrain within the housing; the geartrain includes a carrier; the carrier defines a center passage and an outer surface, and wherein the center passage of the carrier receives an input shaft; the outer surface of the carrier defines a wave generator portion that defines a wave generator; the harmonic drive has an output shaft that has an output shaft forward portion and an output shaft aft portion; the output shaft aft portion is within the housing and surrounds the carrier; the output shaft forward portion extends through a forward end of the housing; a flex spline is defined by the output shaft aft portion; the flex spline is aligned with the wave generator; a circular spline is defined along the inner surface of the housing; the circular spline is aligned with the flex spline.

19 Claims, 4 Drawing Sheets

HARMONIC DRIVE WITH BALANCED EPICYCLIC GEARTRAIN HAVING A CARRIER WITH AN INTEGRATED WAVE GENERATOR

BACKGROUND

The embodiments are directed to harmonic drives and more specifically to a harmonic drive with balanced epicyclic geartrain having a carrier with an integrated wave generator.

Some actuation systems, such as those found in aircrafts to move control surfaces or rotate moving parts such as a compressor in an environmental control system (ECS), require a high gear ratio. To achieve the high gear ratio, geartrains may be utilized that are complex and have a larger number of moving parts.

BRIEF SUMMARY

Disclosed is a harmonic drive, including a housing having an outer shell extending from a forward end to an aft end and defining an inner surface; an epicyclic geartrain within the housing, wherein the epicyclic geartrain includes a carrier, wherein the carrier defines a center passage and an outer surface, and wherein the center passage of the carrier receives an input shaft, and wherein the outer surface of the carrier defines a wave generator portion that defines a wave generator; the harmonic drive includes an output shaft that has an output shaft forward portion and an output shaft aft portion, wherein the output shaft aft portion is within the housing and surrounds the carrier and the output shaft forward portion extends through the forward end of the housing, and a flex spline is defined by the output shaft aft portion, wherein the flex spline is aligned with the wave generator; and a circular spline is defined along the inner surface of the housing, wherein the circular spline is aligned with the flex spline.

In addition to one or more aspects of the drive or as an alternate, the epicyclic geartrain includes a sun gear that has an inner facing spline and is configured to be driven by the input shaft extending into the housing via the center passage of the carrier.

In addition to one or more aspects of the drive or as an alternate, the drive includes a wave generator bearing, disposed between the wave generator and the flex spline; and clips, fixed to the carrier on the wave generator portion, on opposite sides of the wave generator, that prevent lateral movement of the wave generator bearing against the flex spline.

In addition to one or more aspects of the drive or as an alternate, the epicyclic geartrain includes a ring gear that is stationary within the housing.

In addition to one or more aspects of the drive or as an alternate, the drive includes a forward endcap secured to the forward end of the housing and an aft endcap secured to the aft end of the housing, wherein the forward endcap defines a forward center aperture through which the output shaft forward portion extends, and the aft endcap defines an aft center aperture through which the input shaft is inserted to engage the sun gear.

In addition to one or more aspects of the drive or as an alternate, the carrier has a carrier forward portion that includes the wave generator portion, a carrier aft portion, and a carrier intermediate portion that defines a gap between the carrier forward portion and the carrier aft portion, outer ribs extend over the carrier intermediate portion and connect the carrier forward portion and the carrier aft portion of the carrier to each other, wherein the sun gear and the ring gear are aligned with the carrier intermediate portion of the carrier.

In addition to one or more aspects of the drive or as an alternate, the epicyclic geartrain includes: planet gears aligned with the carrier intermediate portion of the carrier, within the gap, and radially between the sun gear and the ring gear; and planet shafts, extending from planet shaft forward ends to planet shaft aft ends, secured along the carrier intermediate portion of the carrier, that support ones of the planet gears.

In addition to one or more aspects of the drive or as an alternate, portions of the planet gears extend radially out of the carrier, circumferentially between adjacent ones of the ribs, to engage the ring gear.

In addition to one or more aspects of the drive or as an alternate, the carrier aft portion of the carrier defines a carrier outer passage portion that is adjacent to the carrier intermediate portion and has circumferentially distributed carrier outer passages; the carrier outer passages each define passage aft openings into which ones of the planet shafts is inserted and extend into the carrier intermediate portion; and the planet shafts are sized so that the aft end of the planet shafts remain in ones of the carrier outer passages while the planet gears receive ones of the planet shafts.

In addition to one or more aspects of the drive or as an alternate, the passage aft openings, of the carrier outer passages of the carrier, face the aft endcap to prevent lateral movement of the planet shafts.

In addition to one or more aspects of the drive or as an alternate, an aft segment of the wave generator portion of the carrier defines circumferentially distributed forward pockets that are aligned with ones of the carrier outer passages; and the forward pockets receive and support the planet shaft forward ends of ones of the planet shafts.

In addition to one or more aspects of the drive or as an alternate, the carrier aft portion of the carrier defines a carrier aft bearing support that is adjacent to the aft endcap and aft of the carrier outer passage portion, wherein the carrier aft bearing support is radially smaller than the carrier outer passage portion, whereby the planet shafts are inserted into the carrier outer passage portion; the aft endcap defines an annular recess that surrounds the carrier aft bearing support to define an aft endcap bearing support; and the harmonic drive includes a carrier aft bearing disposed between the carrier aft bearing support and the aft endcap bearing support.

In addition to one or more aspects of the drive or as an alternate, the carrier forward portion defines a carrier forward bearing support that is adjacent to, and forward of, the wave generator portion, wherein the carrier forward portion is radially smaller than the wave generator portion, to thereby define a carrier forward wall; the carrier aft portion of the output shaft defines nested cup portions including a base, an inner cup portion and an outer cup portion, wherein the inner cup portion extends from the base to the carrier forward wall to surround the carrier forward bearing support of the carrier and to define an inner cup bearing support; and the harmonic drive includes a carrier forward bearing disposed between the carrier forward bearing support and the inner cup bearing support.

In addition to one or more aspects of the drive or as an alternate, the carrier forward bearing is a ball bearing.

In addition to one or more aspects of the drive or as an alternate, the carrier forward bearing support and the carrier aft bearing support have a same outer diameter as each other.

In addition to one or more aspects of the drive or as an alternate, the outer cup portion of the output shaft extends aft from the base to the carrier intermediate portion and defines the flex spline.

In addition to one or more aspects of the drive or as an alternate, an output shaft bearing is disposed in the housing, between the forward end of the output shaft and the housing, to prevent lateral movement of the output shaft bearing.

In addition to one or more aspects of the drive or as an alternate, the output shaft bearing is another ball bearing.

An aircraft assembly, including: a stationary structure; a harmonic drive, having one or more of the above disclosed aspects, wherein the drive is secured to the stationary structure; a motor secured that includes the input shaft that engages the harmonic drive; and a movable aircraft structure that is driven by the output shaft of the harmonic drive.

In addition to one or more aspects of the assembly or as an alternate, the movable aircraft structure is a control surface.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
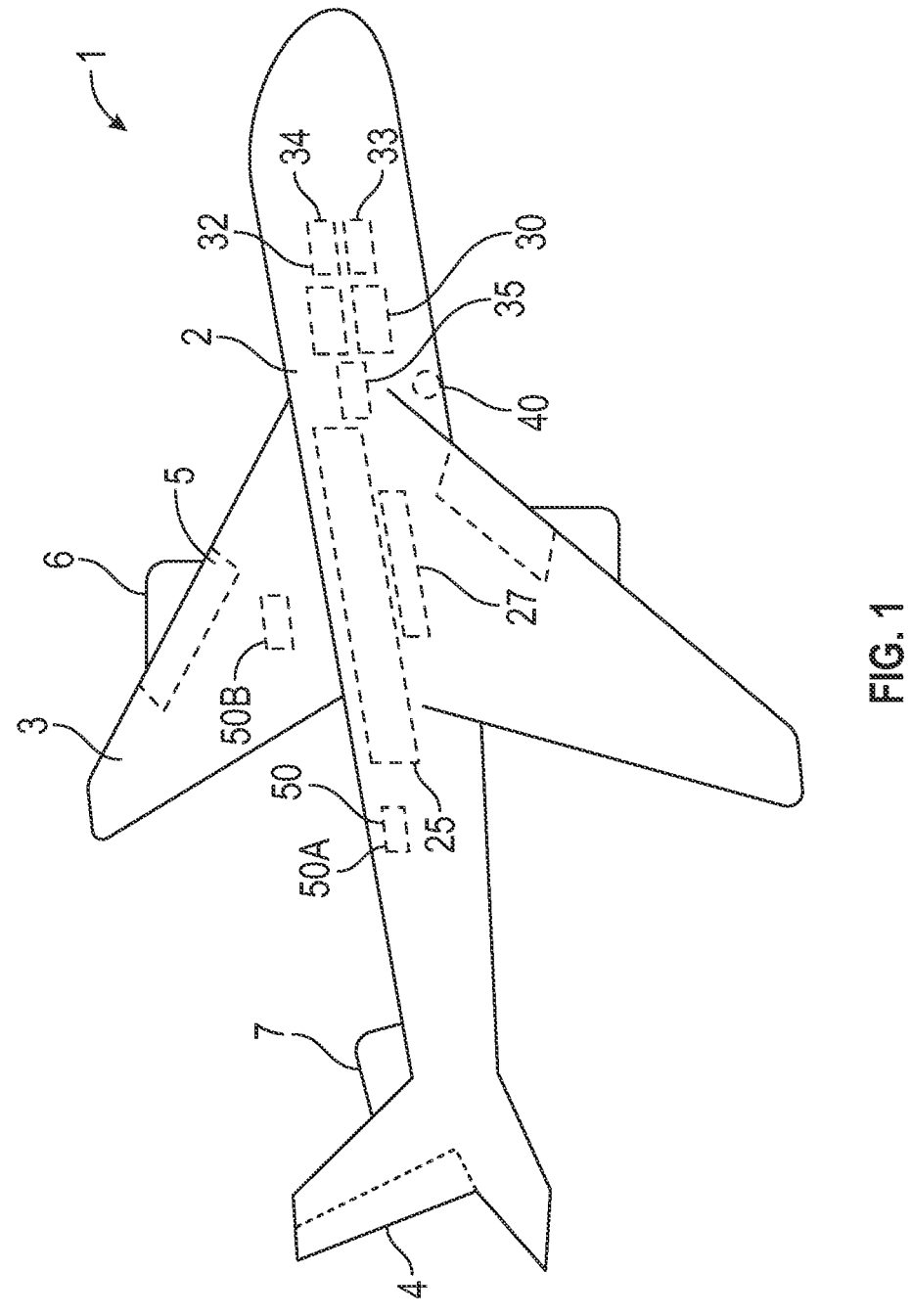
FIG. 1 shows an aircraft that utilizes a harmonic drive according the embodiments.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have a cabin 25, a cargo bay 27, an environmental control system (ECS) 30 for conditioning the cabin 25 and/or cargo bay 27. The ECS 30 may include a vapor compression system (VCS) 32 that cools air directed to, e.g., the cargo bay 27 and provides refrigeration to one or more systems 35 of the aircraft 1, and an air cycle machine (ACM) that cools air directed to e.g., the cabin 25. A RAM air inlet 40 may scoop air for the ECS 30, or the ECS 30 may receive air recirculated from, e.g., a cabin air compressor (CAC) 34. The rotary components of the aircraft 1 (each being a movable aircraft structure) may be driven by a motor 50A, e.g., within the wing 3 or a motor 50B the fuselage (generally a motor 50). Systems of the aircraft 1 may be referred to as an aircraft assembly.

Figure 2:
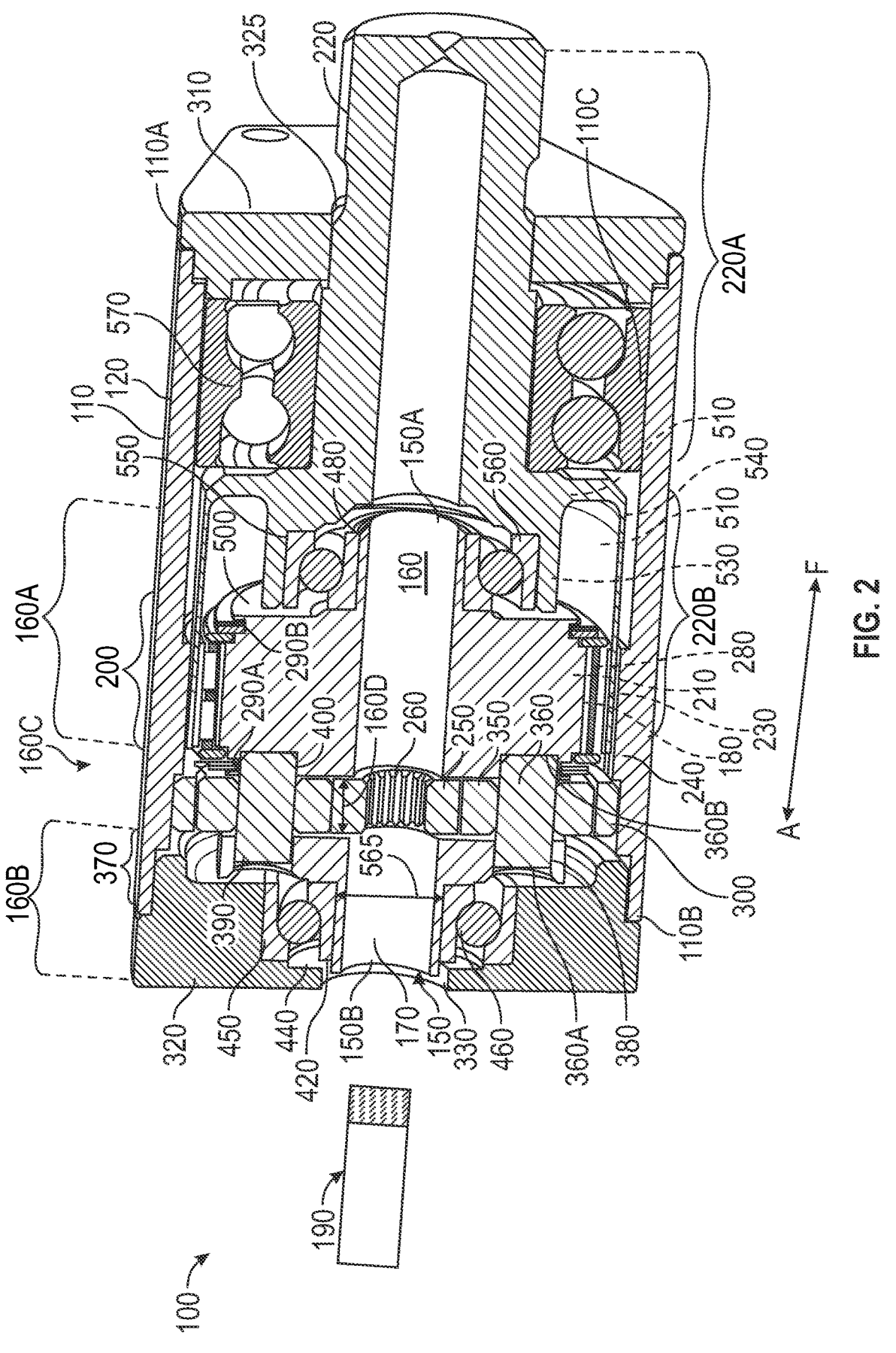
FIG. 2 shows the harmonic drive according to an embodiment.
Figure 3:
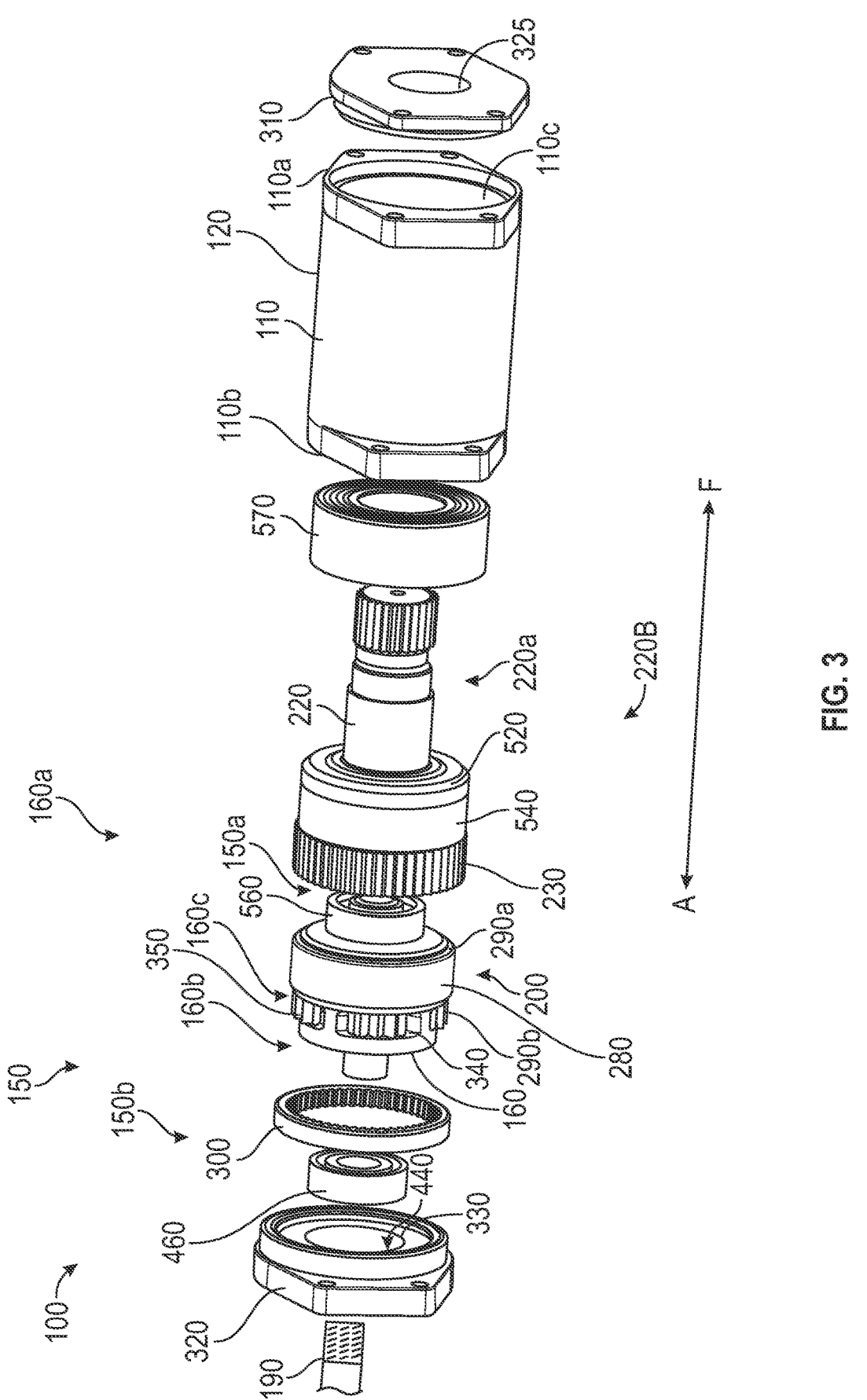
FIG. 3 is an exploded view of the harmonic drive of FIG. 2.
Figure 4:
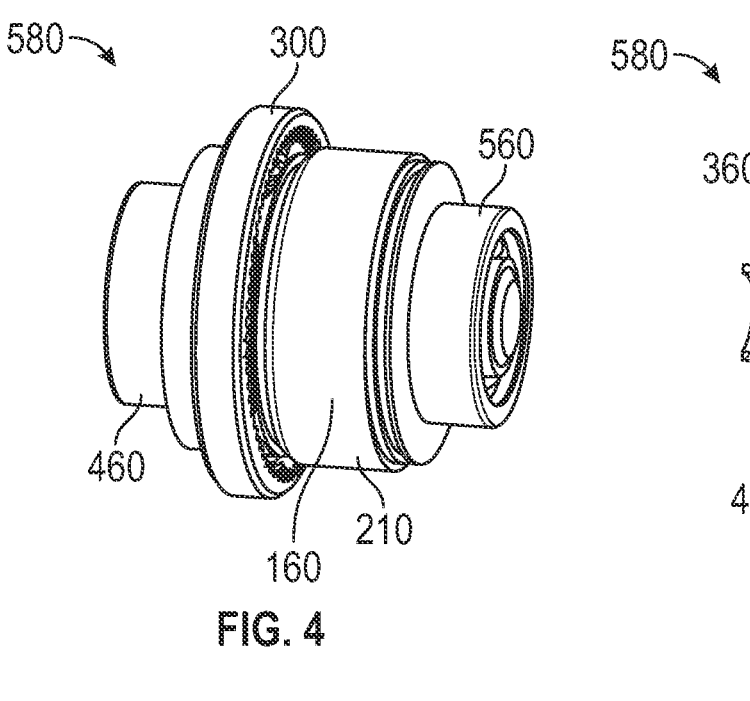
FIG. 4 is a perspective view of a geartrain module which may be utilized with the harmonic drive of FIG. 2, according to an embodiment.
Figure 5:
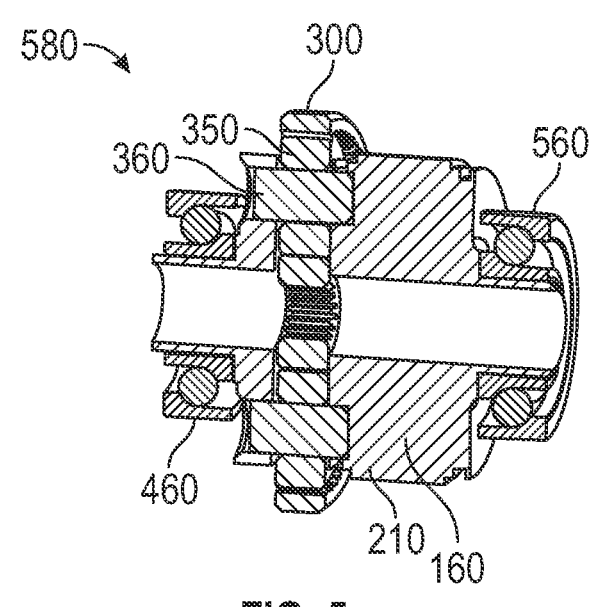
FIG. 5 is a cross sectional view of the geartrain module of FIG. 4.
Figure 6:
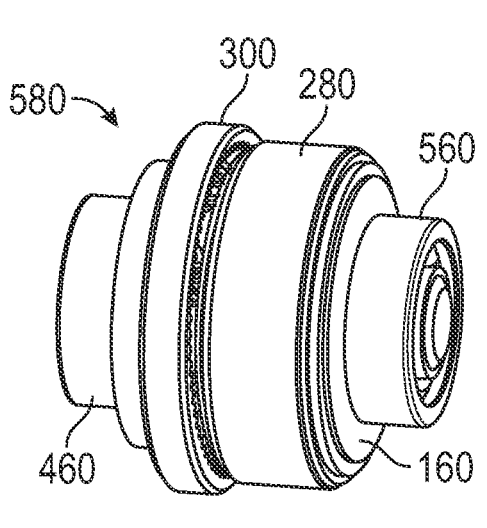
FIG. 6 is a perspective view of a geartrain module, having the wave generator bearing, and which may be utilized with the harmonic drive of FIG. 2, according to an embodiment.
Figure 7:
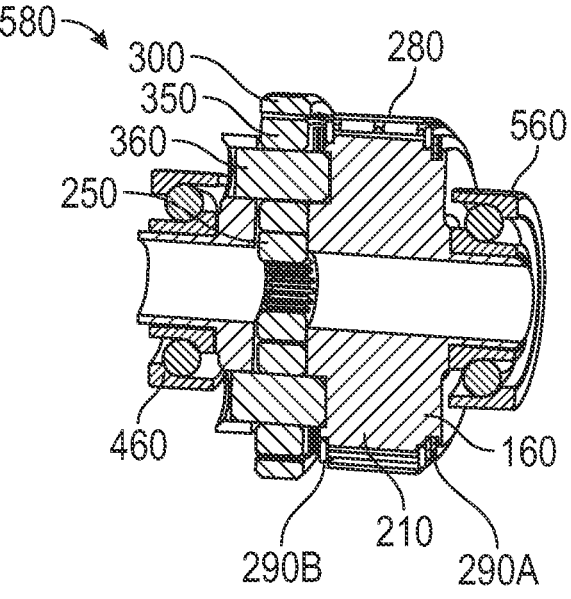
FIG. 7 is a cross-sectional view of the geartrain module of FIG. 6.

Turning to FIGS. 2 and 3, a harmonic drive 100, secured to a stationary structure such as an aircraft frame member, may be utilized to connect the motor 50 to the rotary component of the aircraft, such as a control surface 5 or other rotary part, such as a compressor of the ECS 30. The harmonic drive 100 enables ratios of input to output speed, and input to output torque, that allow for relatively small motors 50 having one rotation speed to drive relatively heavy structures at another, targeted, rotation speed.

The drive 100 has housing 110 that has an outer shell 120. With the outer shell 120, the housing 110 extends from a housing forward end 110A to a housing aft end 110B, e.g., along a forward-aft (A-F) axis, and defines an inner surface 110C.

An epicyclic geartrain 150 is disposed within the housing 110. The epicyclic geartrain 150 extends a geartrain forward end 150A to a geartrain aft end 150B and includes a carrier 160 extending from a carrier forward portion 160A to a carrier aft portion 160B. When the geartrain 150 is assembled, the carrier 160 and geartrain 150 have a same axial span, from forward to aft ends. The carrier 160 defines a carrier center passage 170 and a carrier outer surface 180. The carrier center passage 170 receives an input shaft 190. The carrier outer surface 180 defines a wave generator portion 200, i.e., that defines a wave generator 210 (or wave generator profile).

The drive 100 includes an output shaft 220 that has an output shaft forward portion 220A and an output shaft aft portion 220B. The output shaft aft portion 220B is within the housing 110 and surrounds the carrier 160. The output shaft forward portion 220A extends through the forward end 110A of the housing 110.

A flex spline 230 is defined by the output shaft aft portion 220B. The flex spline 230 is aligned with the wave generator 210. A circular spline 240, e.g., having inner facing spline teeth, is defined along the inner surface 110C of the housing 110. The circular spline 240 is aligned with the flex spline 230.

The epicyclic geartrain 150 includes a sun gear 250 that has an inner facing spline 260. The sun gear 250 is driven by the input shaft 190 extending into the housing 110 via the center passage 170 of the carrier 160. The epicyclic geartrain 150 includes a wave generator bearing 280. The wave generator bearing 280 is disposed between the wave generator 210 and the flex spline 230.

Forward and aft clips 290A, 290B (generally referred to as clips 290) are fixed to the carrier 160 on the wave generator portion 200. The clips 290 are located on opposite sides of the wave generator 210. The clips 290 prevent lateral movement of the wave generator bearing 280 against the flex spline 230.

The epicyclic geartrain 150 includes a ring gear 300. The ring gear 300 is stationary within the housing 110. The drive 100 includes a forward endcap 310 secured to the forward end 110A of the housing 110. An aft endcap 320 is secured to the aft end 110B of the housing 110. The forward endcap 310 defines a forward center aperture 325 through which the output shaft forward portion 220A of the output shaft 220 extends. The aft endcap 320 defines an aft center aperture 330 through which the input shaft 190 is inserted to engage the sun gear 250.

Between the carrier forward portion 160A and carrier aft portion 160B, the carrier 160 has a carrier intermediate portion 160C. The carrier intermediate portion 160C that defines a gap 160D between the carrier forward portion 160A and the carrier aft portion 160B. Outer ribs 340 extend over the carrier intermediate portion 160C. That is, the ribs 340 connect the carrier forward portion 160A and the carrier aft portion 160B to each other.

The sun gear 250 and the ring gear 300 are aligned with the carrier intermediate portion 160C. The epicyclic geartrain 150 includes planet gears 350. The planet gears 350 are aligned with the carrier intermediate portion 160C, within the gap 160D. The planet gears 350 are radially between the sun gear 250 and the ring gear 300.

The epicyclic geartrain 150 also includes planet shafts 360. The planet shafts 360 extend from planet shaft forward ends 360A to planet shaft aft ends 360B. The planet shafts 360 are secured along the carrier intermediate portion 160C. The planet shafts 360 support ones of the planet gears 350.

Portions of the planet gears 350 extend radially out of the carrier 160 (FIG. 3), circumferentially between adjacent ones of the ribs 340. With this configuration, the planet gears 350 engage the ring gear 300.

The carrier aft portion 160B defines a carrier outer passage portion 370 that is adjacent to the carrier intermediate portion 160C of the carrier 160. The carrier outer passage portion 370 has circumferentially distributed carrier outer passages 380. The carrier outer passages 380 each define passage aft openings 390 into which ones of the planet shafts 360 is inserted and extend into the carrier intermediate portion 160C. The planet shafts 360 are sized so that the planet shaft aft ends 360B remain in ones of the carrier outer passages 380 while the planet gears 350 receive ones of the planet shafts 360.

The passage aft openings 390 of the carrier outer passages 380 of the carrier 160 face the aft endcap 320. This configuration prevents lateral movement of the planet shafts 360.

An aft segment 200A of the wave generator portion 200 of the carrier 160 defines circumferentially distributed planet shaft forward pockets 400. The forward pockets 400 are aligned with ones of the carrier outer passages 380. The forward pockets 400 receive and support the planet shaft forward ends 360A of ones of the planet shafts 360. With this configuration, the planet shafts 360 are supported between the planet shaft forward ends 360A and the planet shaft aft ends 360B.

The carrier aft portion 160B defines a carrier aft bearing support 420 that is adjacent to the aft endcap 320 and aft of the carrier outer passage portion 370. The carrier aft bearing support 420 is radially smaller than the carrier outer passage portion 370. This configuration enables planet shafts 360 to be inserted into the carrier outer passage portion 370.

The aft endcap 320 defines an annular recess 440. The annular recess 440 surrounds the carrier aft bearing support 420 to define an aft endcap bearing support 450. The drive 100 includes a carrier aft bearing 460. The carrier aft bearing 460 is disposed between the carrier aft bearing support 420 and the aft endcap bearing support 450.

The carrier forward portion 160A defines a carrier forward bearing support 480 that is adjacent to, and forward of, the wave generator portion 200. The carrier forward bearing support 480 is radially smaller than the wave generator portion 200 to define a carrier forward wall 500.

The output shaft aft portion 220B defines nested cup portions 510. The nested cup portions 510 include a base 520, an inner cup portion 530 and an outer cup portion 540. The inner cup portion 530 extends from the base 520 to the carrier forward wall 500 to surround the carrier forward bearing support 480 of the carrier 160 and to define an inner cup bearing support 550.

The drive 100 includes a carrier forward bearing 560. The carrier forward bearing 560 is disposed between the carrier forward bearing support 480 and the inner cup bearing support 550. The carrier forward bearing 560 is another ball bearing.

In one embodiment, the carrier forward bearing support 480 and the carrier aft bearing support 420 have a same outer diameter 565 as each other. This provides for balancing the carrier 160 within the housing 110.

The outer cup portion 540 of the output shaft 220 extends aft from the base 520 to the carrier intermediate portion 160C and defines the flex spline 230.

An output shaft bearing 570 is disposed in the housing 110. The output shaft bearing 570 is between the output shaft forward portion 220A of the output shaft 220 and the outer shell 120 of the housing 110. This configuration prevents lateral movement of the output shaft bearing 570 within the housing 110. The output shaft bearing 570 is a ball bearing.

Turning to FIGS. 4-7, in one embodiment, a geartrain module 580 may be inserted into the housing 110, via the aft endcap 320. The module 580 includes the carrier 160, the carrier forward bearing 560, the carrier aft bearing 460, the sun gear 250, the planet gears 350, the planet shafts 360 and the ring gear 300. The module 580 may also include the wave generator bearing 280 and bearing clips 290. By changing the module 580, the wave generator 210 defined by the carrier 160 may be changed as well as the configuration of the epicyclic geartrain 150, depending on the output speed and torque requirements.

The embodiments provide a harmonic drive 100 that engages an epicyclic geartrain 150 within a housing 110, where the carrier 160 has an integrated wave generator 210. The epicyclic geartrain 150 positionally is balanced by the utilization of the carrier forward bearing 560 and the carrier aft bearing 460, i.e., at forward and aft ends of the epicyclic geartrain 150. Benefits of the embodiments, compared with other geared solutions, include, e.g., a reduced part count and size of the drive 100.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A harmonic drive, comprising:
a housing having an outer shell extending from a forward end to an aft end and defining an inner surface;
an epicyclic geartrain within the housing,
wherein the epicyclic geartrain includes a carrier, wherein the carrier defines a center passage and an outer surface, and wherein the center passage of the carrier receives an input shaft, and
wherein the outer surface of the carrier defines a wave generator portion that defines a wave generator;
the harmonic drive includes an output shaft that has an output shaft forward portion and an output shaft aft portion,
wherein the output shaft aft portion is within the housing and surrounds the carrier and the output shaft forward portion extends through the forward end of the housing, and
a flex spline, wherein:
the drive includes planet shafts and carrier outer passages;
an aft segment of the wave generator portion of the carrier defines circumferentially distributed forward pockets that are aligned with ones of the carrier outer passages; and the forward pockets receive and support planet shaft forward ends of ones of the planet shafts is defined by the output shaft aft portion, wherein the flex spline is aligned with the wave generator; and
a circular spline is defined along the inner surface of the housing, wherein the circular spline is aligned with the flex spline.

2. The harmonic drive of claim 1, wherein
the epicyclic geartrain includes a sun gear that has an inner facing spline and is configured to be driven by the input shaft extending into the housing via the center passage of the carrier.

3. The harmonic drive of claim 2, including:
a wave generator bearing, disposed between the wave generator and the flex spline; and
clips, fixed to the carrier on the wave generator portion, on opposite sides of the wave generator, that prevent lateral movement of the wave generator bearing against the flex spline.

4. The harmonic drive of claim 3, wherein:
the epicyclic geartrain includes a ring gear that is stationary within the housing.

5. The harmonic drive of claim 4, including
a forward endcap secured to the forward end of the housing and an aft endcap secured to the aft end of the housing,
wherein the forward endcap defines a forward center aperture through which the output shaft forward portion extends, and the aft endcap defines an aft center aperture through which the input shaft is inserted to engage the sun gear.

6. The harmonic drive of claim 5, wherein
the carrier has a carrier forward portion that includes the wave generator portion, a carrier aft portion, and a carrier intermediate portion that defines a gap between the carrier forward portion and the carrier aft portion,
outer ribs extend over the carrier intermediate portion and connect the carrier forward portion and the carrier aft portion of the carrier to each other,
wherein the sun gear and the ring gear are aligned with the carrier intermediate portion of the carrier.

7. The harmonic drive of claim 6, wherein the epicyclic geartrain includes:
planet gears aligned with the carrier intermediate portion of the carrier, within the gap, and radially between the sun gear and the ring gear; and
the planet shafts, extending from planet shaft forward ends to planet shaft aft ends, secured along the carrier intermediate portion of the carrier, support ones of the planet gears.

8. The harmonic drive of claim 7, wherein
portions of the planet gears extend radially out of the carrier, circumferentially between adjacent ones of the ribs, to engage the ring gear.

9. The harmonic drive of claim 8, wherein:
the carrier aft portion of the carrier defines a carrier outer passage portion that is adjacent to the carrier intermediate portion and has the carrier outer passages, which are circumferentially distributed;
the carrier outer passages each define passage aft openings into which ones of the planet shafts is inserted and extend into the carrier intermediate portion; and
the planet shafts are sized so that the aft end of the planet shafts remain in ones of the carrier outer passages while the planet gears receive ones of the planet shafts.

10. The harmonic drive of claim 9, wherein the passage aft openings, of the carrier outer passages of the carrier, face the aft endcap to prevent lateral movement of the planet shafts.

11. The harmonic drive of claim 9, wherein:
the carrier aft portion of the carrier defines a carrier aft bearing support that is adjacent to the aft endcap and aft of the carrier outer passage portion,
wherein the carrier aft bearing support is radially smaller than the carrier outer passage portion, whereby the planet shafts are inserted into the carrier outer passage portion;
the aft endcap defines an annular recess that surrounds the carrier aft bearing support to define an aft endcap bearing support; and
the harmonic drive includes a carrier aft bearing disposed between the carrier aft bearing support and the aft endcap bearing support.

12. The harmonic drive of claim 11, wherein
the carrier forward portion defines a carrier forward bearing support that is adjacent to, and forward of, the wave generator portion, wherein the carrier forward portion is radially smaller than the wave generator portion, to thereby define a carrier forward wall;
the carrier aft portion of the output shaft defines nested cup portions including a base, an inner cup portion and an outer cup portion,
wherein the inner cup portion extends from the base to the carrier forward wall to surround the carrier forward bearing support of the carrier and to define an inner cup bearing support; and
the harmonic drive includes a carrier forward bearing disposed between the carrier forward bearing support and the inner cup bearing support.

13. The harmonic drive of claim 12, wherein the carrier forward bearing is a ball bearing.

14. The harmonic drive of claim 13, wherein the carrier forward bearing support and the carrier aft bearing support have a same outer diameter as each other.

15. The harmonic drive of claim 13, wherein the outer cup portion of the output shaft extends aft from the base to the carrier intermediate portion and defines the flex spline.

16. The harmonic drive of claim 13, wherein an output shaft bearing is disposed in the housing, between the forward end of the output shaft and the housing, to prevent lateral movement of the output shaft bearing.

17. The harmonic drive of claim 16, wherein the output shaft bearing is another ball bearing.

18. An aircraft assembly, comprising:

a stationary structure;

the harmonic drive of claim 1 secured to the stationary structure;

a motor secured that includes the input shaft that engages the harmonic drive; and a movable aircraft structure that is driven by the output shaft of the harmonic drive.

19. The aircraft assembly of claim 18, wherein the movable aircraft structure is a control surface.

\* \* \* \* \*